United States Patent
Ligertwood

(10) Patent No.: US 6,708,940 B2
(45) Date of Patent: Mar. 23, 2004

(54) MOUNTING BRACKET

(76) Inventor: Peter Ligertwood, Unicol Engineering, Green Road, Headington, Oxford OX3 8EU (GB)

( * ) Notice: Subject to any disclaimer, the term of this patent is extended or adjusted under 35 U.S.C. 154(b) by 0 days.

(21) Appl. No.: 10/049,390

(22) PCT Filed: Jun. 13, 2001

(86) PCT No.: PCT/GB01/02579

§ 371 (c)(1),
(2), (4) Date: Feb. 12, 2002

(87) PCT Pub. No.: WO01/96780

PCT Pub. Date: Dec. 20, 2001

(65) Prior Publication Data

US 2002/0113178 A1 Aug. 22, 2002

(30) Foreign Application Priority Data

Jun. 13, 2000 (GB) ............................................ 0014345

(51) Int. Cl.⁷ ................................................ A47H 1/10
(52) U.S. Cl. .................... 248/324; 248/279.1; 248/326; 248/920; 403/58; 403/74; 403/157
(58) Field of Search ........................... 248/278.1, 279.1, 248/284.1, 285.1, 286.1, 920, 921, 922, 923, 207, 184.1, 324, 326, 333; 403/73, 74, 119, 150, 157, 58; 362/404

(56) References Cited

U.S. PATENT DOCUMENTS

| | | | | |
|---|---|---|---|---|
| 660,049 A | * | 10/1900 | Cook ........................ | 248/278.1 |
| 873,108 A | * | 12/1907 | Throop et al. .............. | 248/326 |
| 921,970 A | * | 5/1909 | Frantz ........................ | 248/326 |
| 1,263,783 A | * | 4/1918 | Maier ........................ | 248/326 |
| 3,908,942 A | | 9/1975 | Keith et al. | |
| 4,561,797 A | * | 12/1985 | Aldridge ...................... | 403/58 |
| 4,562,987 A | | 1/1986 | Leeds et al. ................. | 248/278 |
| 4,964,606 A | * | 10/1990 | Beam et al. ................. | 248/333 |
| 5,201,896 A | * | 4/1993 | Kruszewski ............. | 248/278.1 |
| 5,842,672 A | | 12/1998 | Sweere et al. ........... | 248/278.1 |
| 5,873,556 A | * | 2/1999 | Reiker ......................... | 248/323 |
| 5,975,472 A | * | 11/1999 | Hung ....................... | 248/278.1 |
| 6,019,332 A | | 2/2000 | Sweere et al. | |
| 6,505,988 B1 | * | 1/2003 | Oddsen, Jr. ................. | 403/110 |

FOREIGN PATENT DOCUMENTS

| | | | | |
|---|---|---|---|---|
| DE | 19638388 A | 4/1998 | | |
| EP | 0 009 463 A1 | 4/1980 | .......... | A47B/81/06 |
| FR | 2629564 A | 10/1989 | | |
| WO | 94/18489 | 8/1994 | .......... | F16M/11/04 |
| WO | 98/13643 | 4/1998 | .......... | F16M/11/04 |

* cited by examiner

Primary Examiner—Korie Chan
(74) Attorney, Agent, or Firm—Davis & Bujold, PLLC

(57) ABSTRACT

A mounting unit (11) for a attaching a working unit such as a video projector to a mounting surface which can be horizontal or vertical or at some angle intermediate the horizontal and the vertical comprising: an anchorage (12) whereby the unit can be attached to the mounting surface; a beam (13); a carrier (18) comprising in combination a holding plate (19) and a mounting plate; the carrier being adapted to provide for the attachment of a working unit to the mounting plate; a first pivot (20a) whereby a first end of the beam is pivotably attached to the anchorage to enable the beam to pivot about a first axis (a1); a second pivot whereby the other end of the beam to the first end is pivotably attached to the holding plate to enable the holding plate to pivot about a second axis (a2) parallel to the first axis; a third pivot (24) whereby the holding plate can pivot about a third axis perpendicular to the second axis; a fourth pivot (23) whereby the holding plate can pivot about a fourth axis (a4) perpendicular to the second and third axes; the carrier including mechanism whereby the mounting plate can be rotated about an fifth axis parallel to the holding plate.

7 Claims, 6 Drawing Sheets

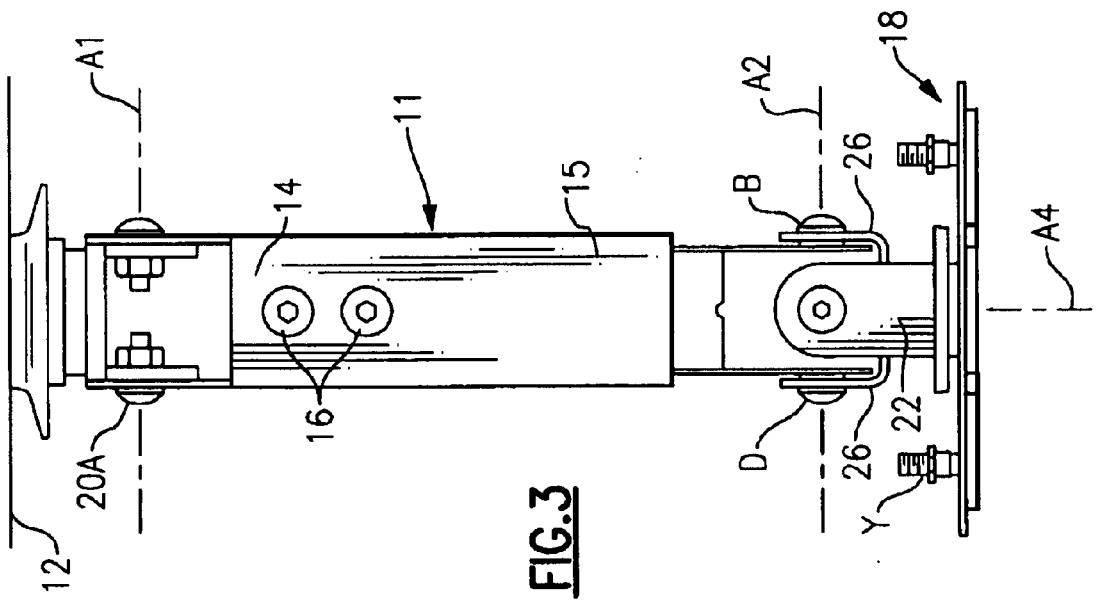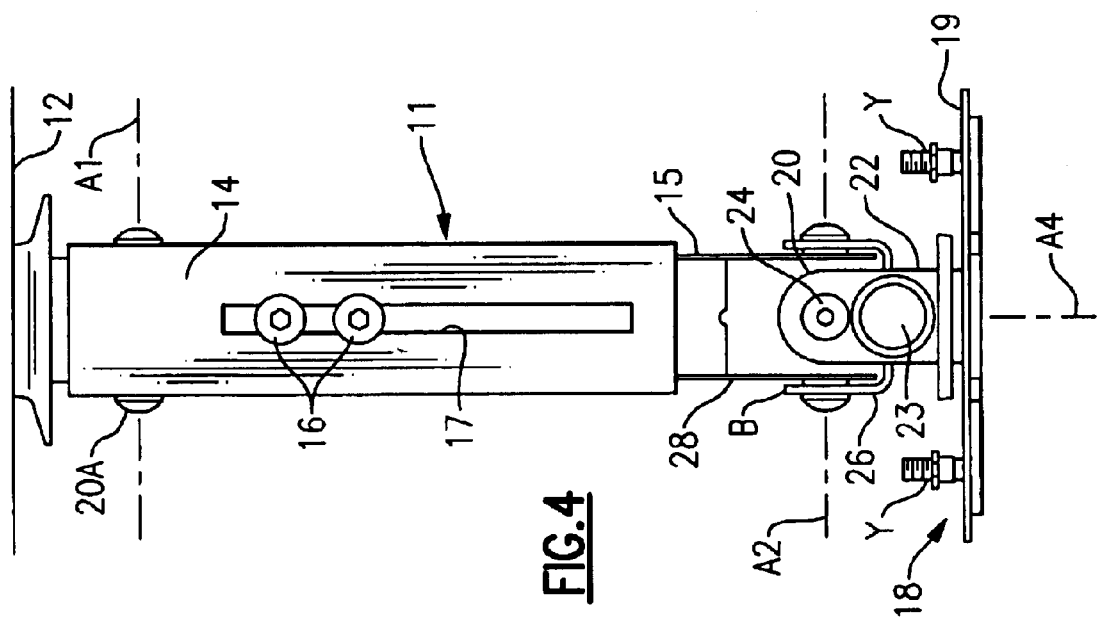

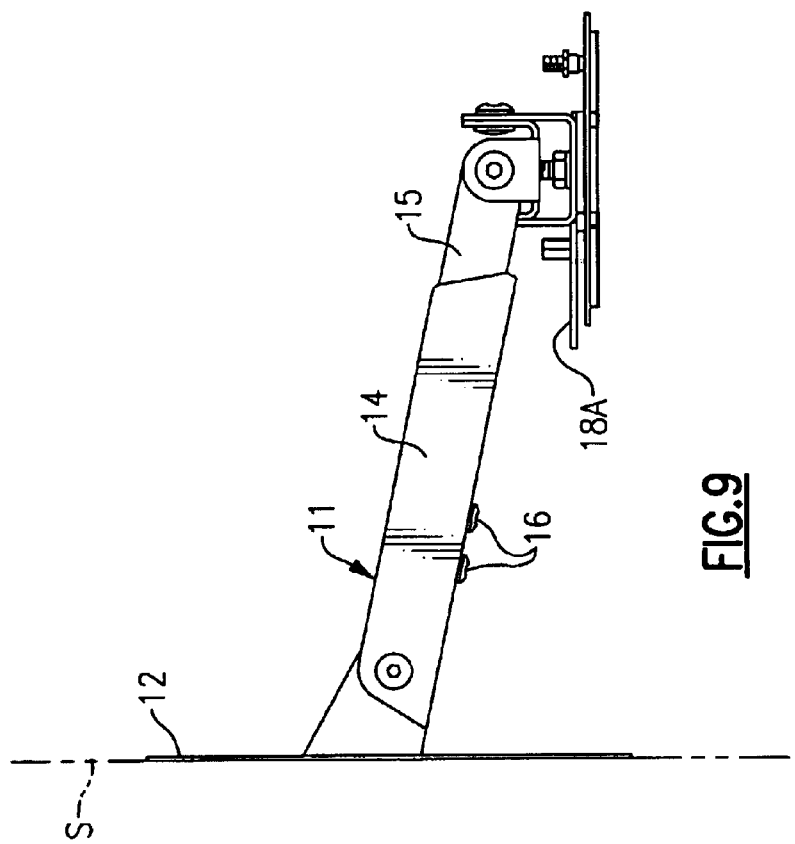
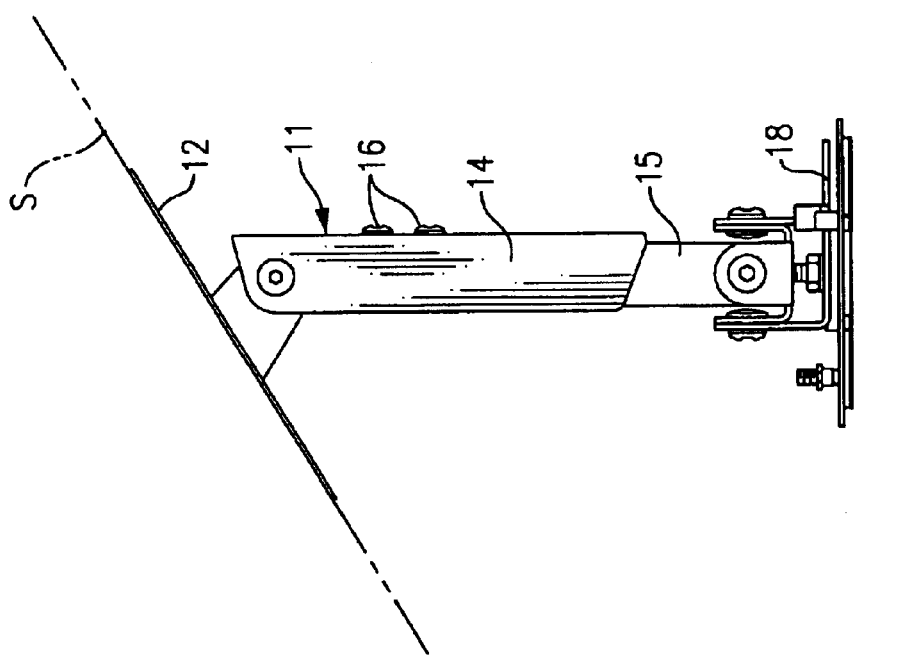

MOUNTING BRACKET

TECHNICAL FIELD

This invention relates to a mounting bracket. In particular it is concerned with a mounting bracket whereby a relatively heavy unit can be readily mounted to enable the unit to function in a required way with a pre-determined alignment. A typical such unit is a video projector though the invention is not limited to a mounting unit for such a projector.

BACKGROUND ART

For the purposes of projecting a video recording or program there are advantages to having a video projector mounted well above the head height of a standing viewer. Typically in a hotel, conference centre or viewing room a mounting bracket at a relatively high locations provides for a projector attached to it to display on a screen without the projected image being interrupted by the passage of a late arrival. However the provision of a high mounting bracket can cause access and alignment problems when a projector is to be mounted by means of the bracket. In addition the bracket while allowing for the ready alignment of an attached projector should also provide for the ready mounting and dismounting of the projector so that when the projector is not to be used for a period the projector can be readily recovered from the bracket for storage in a secure environment.

DISCLOSURE OF INVENTION

According to a first aspect of the present invention there is provided a mounting unit for a attaching a working unit such as a video projector to a mounting surface which can be horizontal or vertical or at some angle intermediate the horizontal and the vertical comprising:

an anchorage whereby the unit can be attached to the mounting surface;
  a beam;
  a carrier comprising in combination a holding plate and a mounting plate; the carrier being adapted to provide for the attachment of a working unit to the mounting plate;
  a first pivot whereby a first end of the beam is pivotably attached to the anchorage to enable the beam to pivot about a first axis;
  a second pivot whereby the other end of the beam to the first end is pivotably attached to the holding plate to enable the holding plate to pivot about a second axis parallel to the first axis;
  a third pivot whereby the holding plate can pivot about a third axis perpendicular to the second axis;
  a fourth pivot whereby the holding plate can pivot about a fourth axis perpendicular to the second and third axis;
  the carrier including means whereby the mounting plate can be rotated about an fifth axis parallel to the holding plate.

In a first preferred version of the present invention the mounting plate is coupled to the holding plate by way of a bayonet connection providing for the mounting plate to be rotatable about a mounting axis defined by the holding plate from a first position where the mounting plate can be presented to, and engaged with, the holding plate and a second position and a locking means whereby, at least with the mounting plate in the second position, the mounting plate and the holding plate are locked against rotation about the mounting axis. Typically the bayonet connection is adapted so as to provide that, except when the mounting plate is in the second position, the mounting plate and the holding plate are engaged to provide for rotation of the mounting plate about the mounting axis relative to the holding plate.

In a second preferred version of the present invention the beam is telescopic and variable in length to provide for maximum and minimum separation of the first axis and the second axis.

According to a third preferred version of the present invention the beam is adapted to provide for a first configuration the first end of the beam acts to engage the anchorage so as to provide for two operating positions for the mounting unit:

a first stable operating position wherein the beam is at right angles to the anchorage; and
  a second stable operating position where the beam is at a pre-determined angle other than a right angle to the anchorage.

According to a second aspect of the present invention there is provided a mounting unit according to the first aspect wherein the mounting plate is engaged with a load, such as a video projector.

According to a third aspect of the present invention there is provided a mounting unit according to the first or the second aspect wherein the anchorage is mounted on a surface selected from a group comprising: a horizontal surface, a vertical surface or a surface lying between a horizontal surface and a vertical surface.

BRIEF DESCRIPTION OF DRAWINGS

An exemplary embodiment of the invention will now be described with reference to the accompanying drawings of a mounting bracket for a video projector of which:

FIG. 3 is a front view in a suspended configuration;
FIG. 4 is a rear view in a suspended configuration;
FIG. 9 is side elevation of the bracket of FIGS. 1–4 when mounted in a horizontal configuration;
and
  FIG. 10 is a side elevation of the bracket of FIGS. 1–4 when mounted.

MODE FOR CARRYING OUT THE INVENTION

Figure 7:
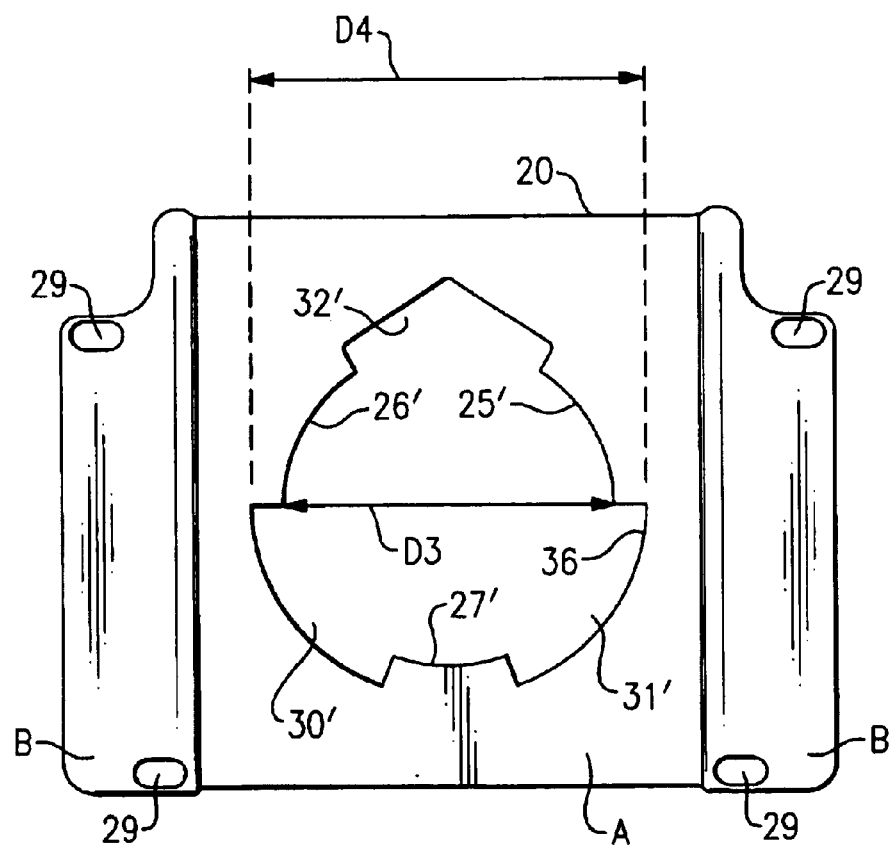
FIG. 7 is a plan view of a component of the bracket.
Figure 8:
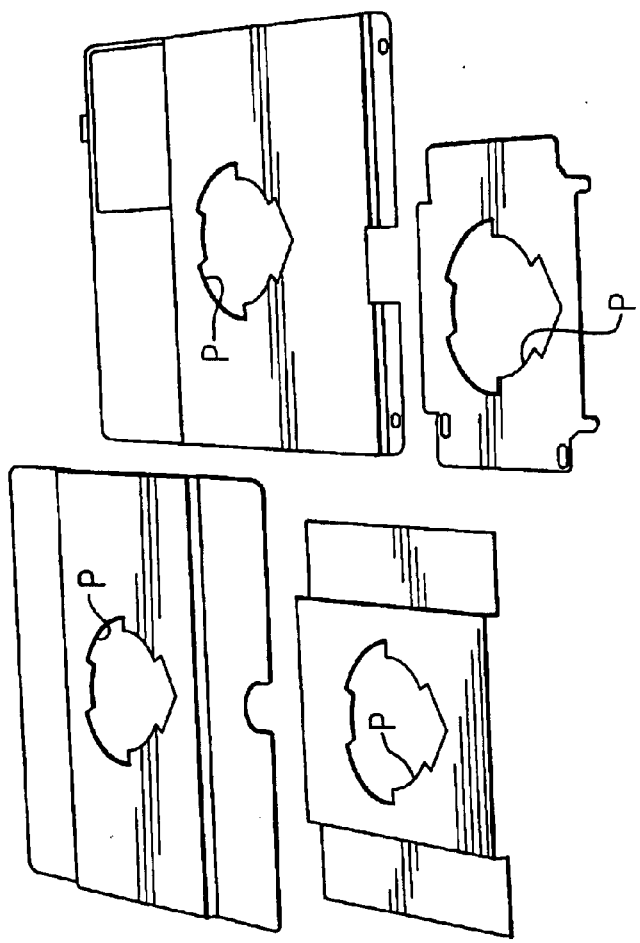
FIG. 8 is a perspective views of number of possible alternative components to that shown in FIG. 7.

The figures show in whole or in part a mounting unit 11 for attaching a video projector (not shown) to a mounting surface which can be horizontal or vertical or at some angle intermediate the horizontal and the vertical comprising. The mounting unit 11 includes:

a rectangular anchorage plate 12 whereby the unit 11 can be attached to a mounting surface S (the surface S being shown as horizontal in FIGS. 1–4, vertical in FIG. 9 and at an angle in FIG. 10);
  a beam 13 in two telescoping parts, upper part 14 and lower part 15, which are linked by clamp bolts 16 acting through slot 17 in upper part 14;
  a carrier 18 comprising in combination a holding plate 19 and a mounting plate 20 (see FIGS. 7 and 8). The carrier 18 provides for the demountable attachment of a video projector to which mounting plate 20 has been previously fitted.

The mounting bracket 11 incorporates a number of pivots to enable a video projector mounted on a surface by means of the bracket 11 can be readily and accurately aligned.

First pivot 20A serves to couple upper end 21 of upper beam part 14 to the anchorage plate 12 so as to enable the beam 13 to pivot about a first axis A1.

Holding plate 19 of carrier 18 (see FIG. 4) is incorporated in the bracket 11 by means of a first fork 22 which is pivotably attached to the holding plate 19 by a fourth pivot 23 to enable the first fork 22 to pivot relative to the holding plate 18A about a fourth axis A4.

First fork 22 (see FIG. 2) is pivotably coupled by third pivot 24, 25 to a diametrically opposed arms A, C of a four armed member 26 to enable the holding plate 19 to pivot about a third axis A3.

Four armed member 26 has its remaining pair of diametrically opposed arms B, D to enable outer end 28 of lower beam 15, to pivot about second axis A2 relative to the four armed member 26.

Figure 6:
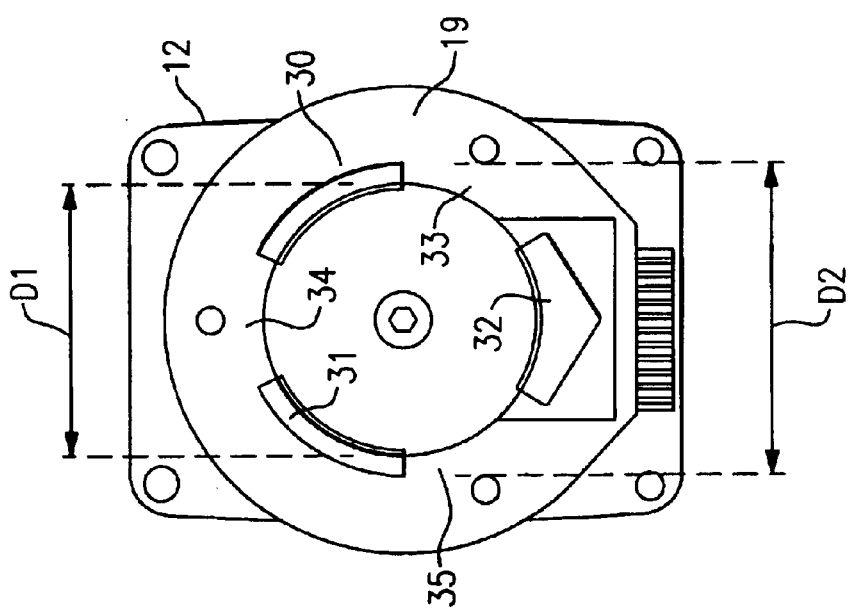
FIG. 6 is a view from beneath in the suspended configuration of a partially dismantled bracket.

FIG. 6 shows the holding plate 19 of the present embodiment, which has three projecting segments 30, 31, 32 spaced apart on an annular locus with internal diameter D1 and, in the case of segments 30, 31, an external diameter D2. Segment 30, 31 are arcs of annular form. Segment 32 is of a unique shape so that when the mounting plate 20 (described hereafter with reference to FIG. 7) is presented to engage with the holding plate 19. The segments 30, 31, 32 are pressed out from the main part of the holding plate 19 so that they project downwardly (as viewed in FIG. 1) and then outwardly to define outwardly facing clearance (for example clearance X, FIG. 1) providing for engagement with complementary components on the mounting plate 20.

The segments 30, 31, 32 are spaced to leave, respectively, arctuate gaps 33, 34, 35.

FIG. 7 shows the mounting plate 20 of the present embodiment having a raised flat central region A and two flat side regions B. The central region A has a cut out profile 36 whose periphery is of complementary shape to the segments 30, 31, 32 of the holding plate 19. Cut-outs 30', 31' respectively correspond in shape to, but are slightly larger than, segments 30, 31. Cut out 32' corresponds in shape to, but is slightly larger overall than, segment 32. The cut outs 30', 31' 32' are spaced apart to leave three inwardly projecting tongues 25', 26' 27' complementary in form to the gaps 33, 34, 35 of the holding plate 19.

Internal diameter D3 of the profile 36 is slightly larger than diameter D1 of the holding plate 19. Likewise external diameter D4 is slightly larger than the external diameter D2 of the holding plate. Each side region B of the mounting plate 20 is provided with two slots 29 whereby the mounting plate 20 can be attached to existing mounting sockets on a given of video projector.

By providing the unique shaped cut-out 32' it is only possible to engage the mounting plate 20 with its attached projector to the holding plate 19 by aligning segment 32 with cut-out 32' and then raising the mounting plate so that the cut-outs 30', 31' 32' pass over the corresponding segments 30, 31, 32. The assembled projector/mounting plate 20 are then rotated about a vertical axis to cause the mounting plate 20 to rotate relative to the holding plate 19 so causing the segments 21, 22, 23 to fill the clearance X between the segments 30, 31, 32 and the holding plate 19.

Figure 1:
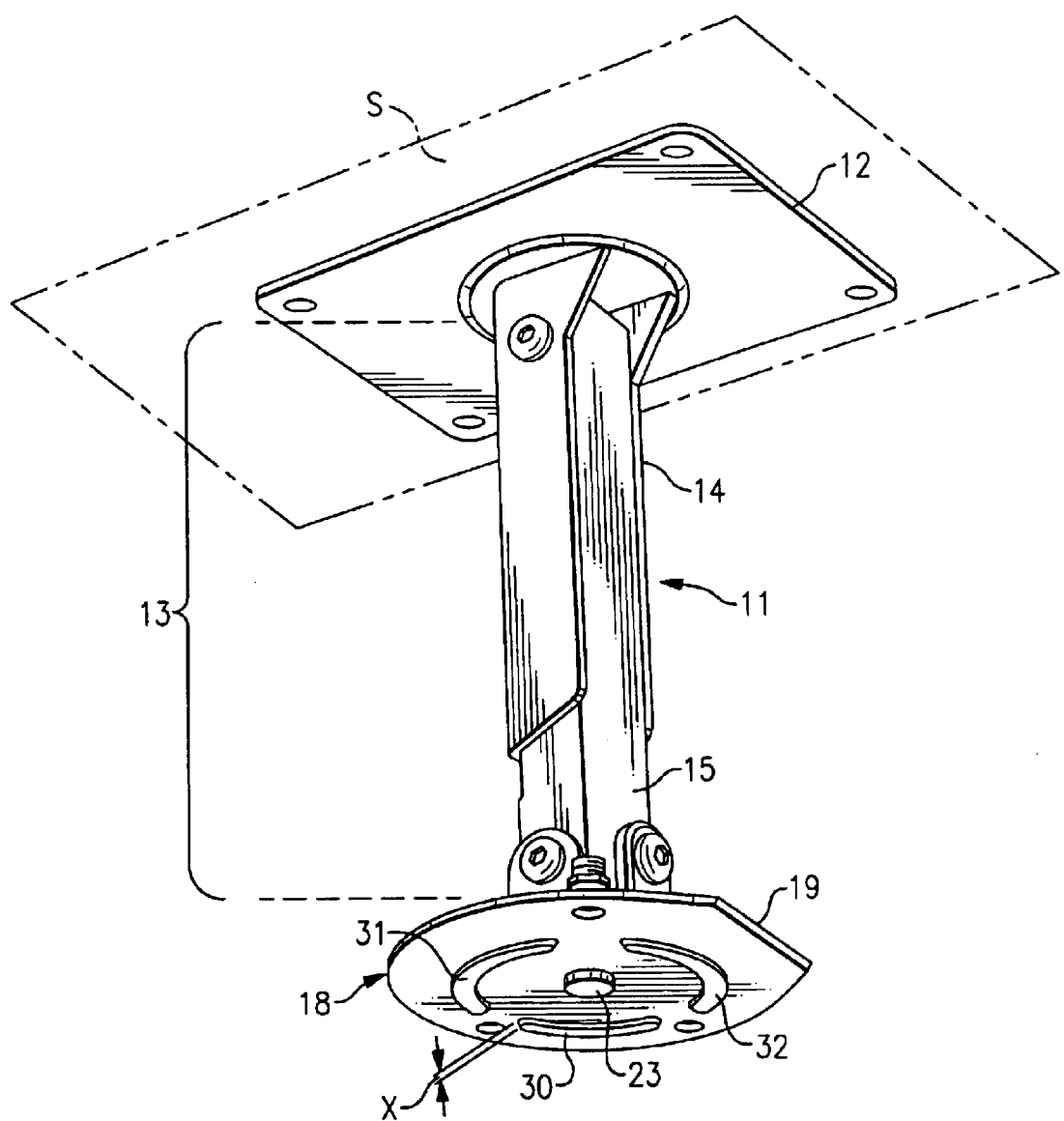
FIG. 1 is a perspective view below and one side.
Figure 2:
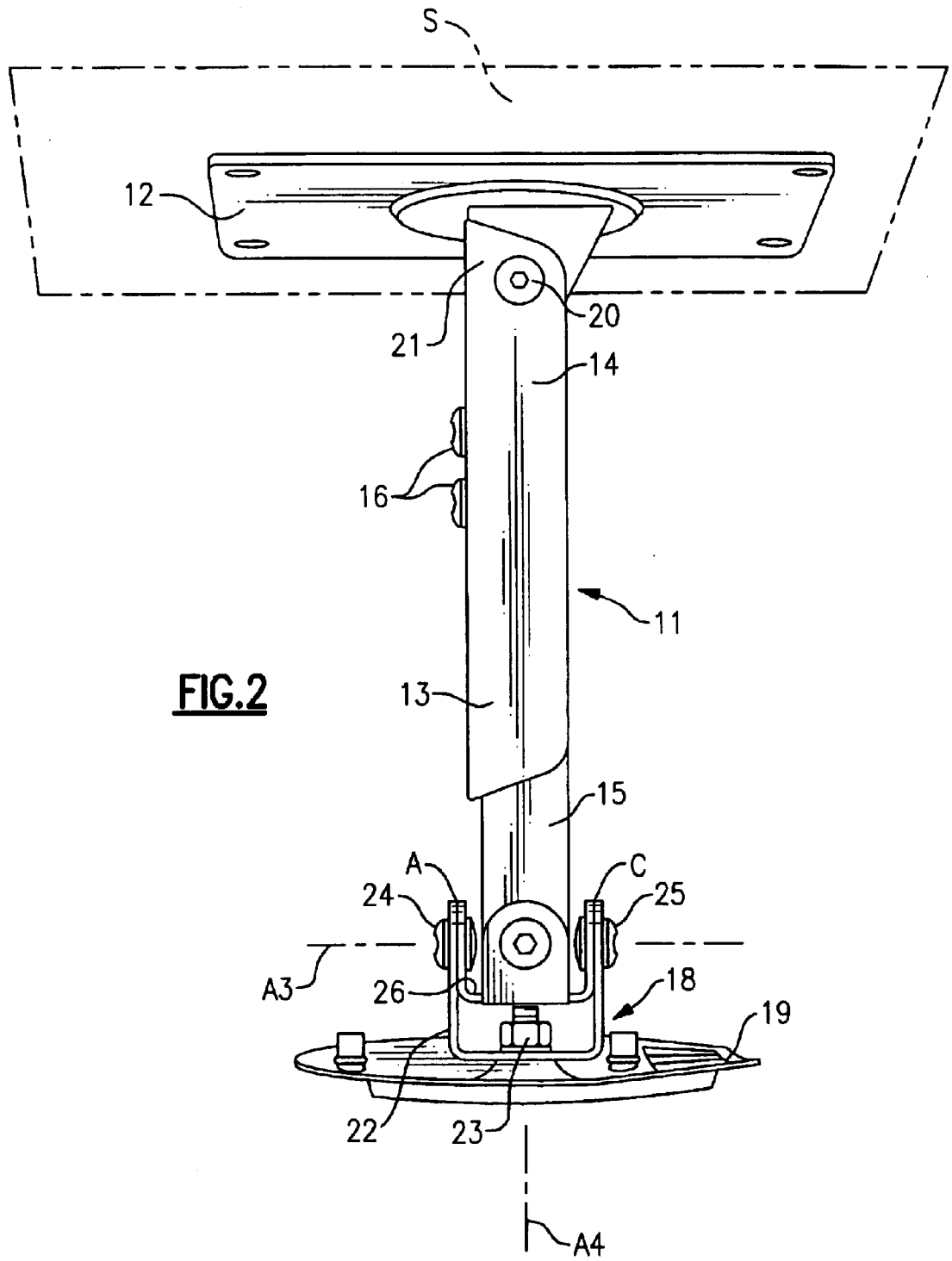
FIG. 2 is a side view in a suspended configuration.
Figure 5:
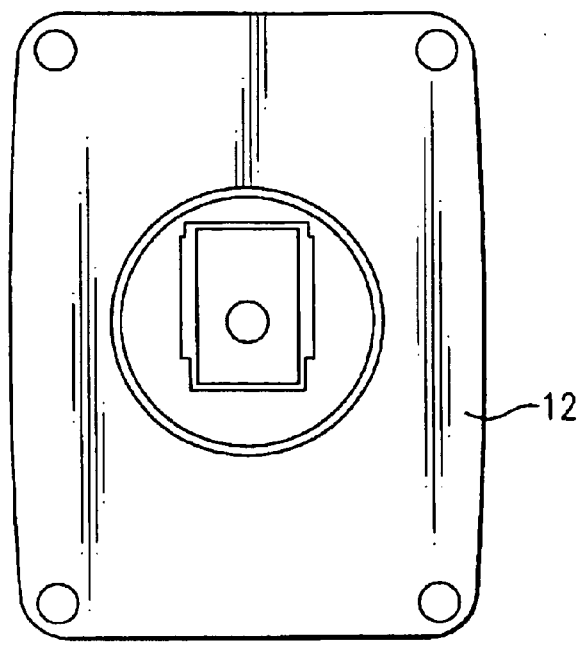
FIG. 5 is a view from above.

Once the mounting plate 20/video projector are mounted on the mounting plate 20 is clamped by bolts Y (FIGS. 4 and 5) to the holding plate 19. Thereafter any necessary changes are readily made to align the projector to provide for the desired image alignment on a screen by adjusting the appropriate clamp bolts. By clearly defining axis A1 to A4 and providing separate clamping means in relation to each axis the projector can be readily aligned.

This arrangement of segments 30, 31, 32 and tongues 25', 26', 27' serves to provide for the ready and positive engagement of a projector with the bracket 11 under conditions of inconvenient access for a person undertaking the mounting. For example the person may be having to use a step ladder to reach the lower end of the bracket 11 while supporting the not inconsiderable weight of a projector-attached to its mounting plate 20. The subsequent offering up of the mounting plate 20 and the projector can involve manipulation of the assembly at or above head level. The ability of the mounting plate 20 to align readily with a required initial alignment of the holding plate 19 provides an additional convenience to the user.

FIG. 8 shows a range of alternative mounting plates which enable most commercially available models of video projectors to be attached to the mounting bracket 11. All four items are provided with profile P identical with profile 28 referred to in relation to FIG. 7 so that they engage the holding plate corresponding to plate 19 as described earlier. The difference between the brackets lies in their overall size and the type and geometry of the required mounting means (typically holes or apertures).

Industrial Applicability

The present invention is concerned with a mounting bracket providing a convenient, safe and versatile way of securing a heavy and expensive unit such as a video projector to a supporting surface. The bracket provides a secure mounting enabling the unit to be accurately aligned and from which the unit can be readily removed if required. It is particularly concerned with the provision of a mounting bracket to which the unit can be readily attached by, and without undue hazard to, an individual.

What is claimed is:

1. A mounting unit for attaching a working unit to a mounting surface which can be horizontal or vertical or at some angle intermediate the horizontal and the vertical, the mounting unit comprising:

an anchorage whereby the unit can be attached to the mounting surface;

a beam;

a carrier comprising in combination a holding plate and a mounting plate;

the carrier being adapted to provide for the attachment of a working unit to the mounting plate;

the mounting plate being coupled to the holding plate by way of a bayonet connection providing for the mounting plate to be rotatable about a mounting axis defined by the holding plate from a first position, where the mounting plate can be presented to, and engaged with the holding plate to a second position; a locking means whereby at least with the mounting plate in the second position, the mounting plate and the holding plate are locked against rotation about the mounting axis;

a first pivot whereby a first end of the beam is pivotably attached to the anchorage to enable the beam to pivot about a first axis;

a second pivot whereby the other end of the beam opposite to the first end is pivotably attached to the holding plate to enable the holding plate to pivot about a second axis parallel to the first axis;

a third pivot whereby the holding plate can pivot about a third axis lying in substantially the same plane as the second axis and perpendicular to the second axis;

a fourth pivot whereby the holding plate can pivot about a fourth axis perpendicular to the second and third axes;

the carrier including means whereby the mounting plate can be rotated about a fifth axis parallel to the holding plate.

2. The mounting unit according to claim 1, wherein the bayonet connection is adapted so as to provide that, except when the mounting plate is in the second position, the mounting plate and the holding plate are engaged to provide for rotation of the mounting plate about the mounting axis relative to the holding plate.

3. The mounting unit according to claim 1 wherein the beam is telescopic and variable in length to provide for maximum and minimum separation of the first axis and the second axis.

4. The mounting unit according to claim 1, wherein a first configuration the first end of the beam acts to engage the anchorage so as to provide for two operating positions for the mounting unit: a first stable operating position wherein the beam is at right angles to the anchorage; and a second stable operating position where the beam is at a predetermined angle other than a right angle to the anchorage.

5. The mounting unit according to claim 1, wherein when the mounting plate in engaged with a load, such as a video projector.

6. The mounting unit according to claim 1, wherein the anchorage is mounted on a surface selected from: a horizontal surface, a vertical surface or a surface lying between a horizontal surface and a vertical surface.

7. A mounting unit for attaching a video projector to a mounting surface which can be horizontal or vertical or at some angle intermediate the horizontal and the vertical, the mounting unit comprising:

an anchorage whereby the unit can be attached to the mounting surface;

a beam;

a carrier comprising in combination a holding plate and a mounting plate; the carrier being adapted to provide for the attachment of a video projector to the mounting plate; the mounting plate being coupled to the holding plate by way of a bayonet connection providing for the mounting plate to be rotatable about a mounting axis defined by the holding plate from a first position 24 where the mounting plate can be presented to, and engaged with the holding plate to a second position; a locking means whereby at least with the mounting plate in the second position, the mounting plate and the holding plate are locked against rotation about the mounting axis;

a first pivot whereby a first end of the beam is pivotably attached to the anchorage to enable the beam to pivot about a first axis;

a second pivot whereby the other end of the beam opposite to the first end is pivotably attached to the holding plate to enable the holding plate to pivot about a second axis parallel to the first axis;

a third pivot whereby the holding plate can pivot about a third axis lying in substantially the same plane as the second axis and perpendicular to the second axis;

a fourth pivot whereby the holding plate can pivot about a fourth axis perpendicular to the second and third axis;

the carrier including means whereby the mounting plate can be rotated about a fifth axis parallel to the holding plate.

\* \* \* \* \*